United States Patent
Unternahrer

[19]

[11] Patent Number: 6,021,154
[45] Date of Patent: Feb. 1, 2000

[54] LASER SHOCK PEENING METHOD AND REFLECTIVE LASER BEAM HOMOGENIZER

[75] Inventor: Josef Robert Unternahrer, Niskayuna, N.Y.

[73] Assignee: General Electric Company, Schenectady, N.Y.

[21] Appl. No.: 08/976,270

[22] Filed: Nov. 21, 1997

[51] Int. Cl.⁷ ...................................................... H01S 3/08
[52] U.S. Cl. ............................................................ 372/108
[58] Field of Search ............................ 372/25, 106, 108; 148/565, 903

[56] References Cited

U.S. PATENT DOCUMENTS

| | | | |
|---|---|---|---|
| 3,747,019 | 7/1973 | Koechner et al. | 331/94.5 |
| 5,127,019 | 6/1992 | Epstein et al. | |
| 5,131,957 | 7/1992 | Epstein et al. | |
| 5,730,811 | 3/1998 | Azad et al. | 148/565 |
| 5,790,303 | 8/1998 | Weston et al. | 372/72 |

OTHER PUBLICATIONS

Koechner, "Solid–State Laser Engineering", 3rd Edition, 1992, pp: cover, 435–441,476–481 No Month.

Fairand et al., "Laser Generation of High–Amplitude Stress Waves in Materials", J. Appl. Phys. vol. 50, No. 3, Mar. 1979, pp: 1497–1502.

Vaccari, "Laser Shocking Extends Fatigue Life", American Machinist, Jul. 1992, pp: 62–64.

Fairand et al., "Effect of Water and Paint Coatings on the Magnitude of Laser–Generated Shocks", Optics Communications, vol. 18, No. 4, Sep. 1976, pp: 588–591.

Clauer et al., "The Effects of Laser Shock Processing on the Fatigue Properties of 2024–T3 Aluminum", Lasers in Materials Processing, Jan. 1983, pp: cover, 7–22.

Fabbro et al., "Physical Study of Laser–Produced Plasma in Confined Geometry", J. Appl. Phys., vol. 68, No. 2, Jul. 1990, pp: 775–784.

*Primary Examiner*—Rodney Bovernick
*Assistant Examiner*—Robert E. Wise
*Attorney, Agent, or Firm*—Douglas E. Erickson; Marvin Snyder

[57] ABSTRACT

A method for laser shock peening a target surface generates laser pulses from a cavity dumping oscillator having an optically-pumped laser and directs the pulses against the target. A first technique uses pulses having rectangular cross section. A second technique passes each generated pulse two or more times through the same optical amplifier before directing the pulse against the target. A third technique drives the laser with a time pulse of electric current having a rectangular shape. A reflective laser beam homogenizer uses two abutting mirrors to split a laser beam into two equal halves and then uses an odd number of additional mirrors to reflect each half first behind and then to the opposite one of the two mirrors to be reflected back as a beam having interchanged halves.

10 Claims, 3 Drawing Sheets

LASER SHOCK PEENING METHOD AND REFLECTIVE LASER BEAM HOMOGENIZER

FIELD OF THE INVENTION

The present invention relates generally to lasers, and more particularly to a method for laser shock peening and to a reflective laser beam homogenizer.

BACKGROUND OF THE INVENTION

In conventional shot peening, small balls are fired against the surface of a metal target to create plastic deformation and corresponding residual compressive stress in the target workpiece. The residual compressive stress improves the useful fatigue life of the workpiece when it is used in a high stress application. In an exemplary application, conventional shot peening has been used in the manufacture of blades for a gas turbine.

It is known to use laser shock peening in place of conventional shot peening. Here, a cylindrical laser is operated in a pulse mode for directing laser pulses against a workpiece surface. Typically, the workpiece surface has a light-absorbing ablative coating (e.g., black paint) which is covered by a thin layer of water. The laser pulse vaporizes the coating in a small explosion which is confined by the water to develop an instantaneous pressure pulse. The pressure pulse causes plastic deformation and corresponding residual compressive stress in the target workpiece.

Preferably, the laser pulse is generated by a Q-switched oscillator having, in optical alignment, a totally-reflecting mirror, a quarter wave plate, a Pockels cell, a polarizer, an optically-pumped laser rod, and a partially-reflecting mirror. By switching the biasing voltage to the Pockels cell, the laser pulse is removed from the oscillator through the partially-reflecting mirror, passed through an optical amplifier, and directed against a first circular area on the target surface. Additional laser pulses are directed to adjoining, and partially overlapping, circular areas to adequately cover the target surface.

What is needed is a more efficient method for laser shock peening a target surface.

Conventional lasers include slab lasers wherein the lasing medium is a slab having a shape of a generally rectangular parallelepiped. Such lasers produce a laser beam having a cross section taken perpendicular to the laser beam, wherein the cross section has a generally rectangular shape. Conventional slab lasers include those which operate in a pulse mode.

It is known to use a conventional optical amplifier in which a laser beam is passed several times by reflecting mirrors through the amplifier. For a slab laser, the laser beam has a rectangular cross section taken perpendicular to the laser beam, and the laser beam typically is directed to zigzag through the amplifier by total internal reflection to avoid thermal focusing caused by uneven temperature distribution of the slab material, as is known to those skilled in the art. However, employing the total internal reflection technique requires optically polished slab surfaces. Slab materials are known which do not have thermal focusing problems, and the laser beam may be passed straight through optical amplifiers having such slab materials without the need for optically polished slab surfaces. However, the amplified laser beam is somewhat inhomogeneous due to the amplifier's nonhomogeneous gain distribution. It is noted that such laser beam inhomogeneities are self-corrected by the internal reflections of the zigzag technique.

What is needed is a reflective laser beam homogenizer which can be used for diverse purposes such as, but not limited to, homogenizing an amplified laser beam which has a rectangular cross section taken perpendicular to the laser beam and which has passed straight through an optical amplifier.

SUMMARY OF THE INVENTION

A first preferred method of the present invention for laser shock peening a target surface includes generating a first pulse of a laser beam from a cavity dumping oscillator having, in optical alignment, a first end mirror, a Pockels cell, a polarizer, an optically-pumped slab laser, and a second end mirror, wherein the first pulse has a cross section taken perpendicular to the laser beam, and wherein the cross section of the first pulse has a generally rectangular shape. This method also includes directing the first pulse against a first generally rectangular area on the target surface. This method additionally includes generating a second pulse of the laser beam, wherein the second pulse has a cross section taken perpendicular to the laser beam, and wherein the cross section of the second pulse has a shape which is generally identical to the generally-rectangular shape of the cross section of the first pulse. This method further includes directing the second pulse against a second generally rectangular area on the target surface, wherein the second rectangular area is near the first rectangular area.

A second preferred method of the present invention for laser shock peening a target surface includes steps a) through f). Step a) includes the step of generating a first pulse of a laser beam from a cavity dumping oscillator having, in optical alignment, a first end mirror, a Pockels cell, a polarizer, an optically-pumped laser, and a second end mirror. Step b) includes the step, after step a), of passing the first pulse a first time and a second time through a same single-head optical amplifier. Step c) includes the step, after step b), of directing the first pulse against a first area on the target surface. Step d) includes the step of generating a second pulse of the laser beam. Step e) includes the step, after step d), of passing the second pulse a first time and a second time through the single-head optical amplifier. Step f) include the step, after step e), of directing the second pulse against a second area on the target surface, wherein the second area is near the first area.

A third preferred method of the present invention for laser shock peening a target surface includes driving an optically-pumped laser with a time pulse of electric current having a generally rectangular shape. This method also includes generating a first pulse of a laser beam from a cavity dumping oscillator having, in optical alignment, a first end mirror, a Pockels cell, a polarizer, the previously-mentioned optically-pumped laser, and a second end mirror. This method additionally includes directing the first pulse against a first area on the target surface. This method further includes generating a second pulse of the laser beam. This method moreover includes directing the second pulse against a second area on the target surface, wherein the second area is near the first area.

A first preferred embodiment of the reflective laser beam homogenizer of the present invention is for reflecting and generally homogenizing a laser beam, wherein the laser beam has a beam axis, wherein the laser beam has a cross section taken perpendicular to the beam axis, and wherein the cross section has a generally-rectangular shape. This embodiment includes first and second mirrors which generally abut each other along a generally straight edge, wherein the straight edge is positioned to generally perpendicularly intersect the beam axis, wherein the first mirror is aligned to reflect a first half of the laser beam away from the first and second mirrors, and wherein the second mirror is aligned to reflect a second half of the laser beam away from the first and second mirrors. This embodiment also includes a set of additional mirrors, wherein the set consists of an odd number of additional mirrors, and wherein the additional mirrors are positioned such that the reflected first half of the laser beam from the first mirror is reflected towards the second mirror so as to be reflected by the second mirror back alongside the beam axis in place of the second half of the laser beam and such that the second half of the laser beam is reflected towards the first mirror so as to be reflected by the first mirror back alongside the beam axis in place of the first half of the laser beam.

A second preferred embodiment of the reflective laser beam homogenizer of the present invention is for reflecting and generally homogenizing a laser beam, wherein the laser beam has a beam axis, wherein the laser beam has a cross section taken perpendicular to the beam axis, and wherein the cross section has a generally-rectangular shape. This embodiment includes first and second mirrors which generally abut each other along a generally straight edge, wherein the straight edge is positioned to generally perpendicularly intersect the beam axis, wherein the first mirror is aligned to reflect the first half of the laser beam away from the first and second mirrors at an angle of generally ninety degrees with respect to the beam axis, and wherein the second mirror is aligned to reflect the second half of the laser beam away from the first and second mirrors at an angle of generally two hundred seventy degrees with respect to the beam axis. This embodiment also includes a third mirror spaced apart from the first and second mirrors, aligned to reflect the first half of the laser beam from the first mirror away from and behind the first and second mirrors at an angle of generally three hundred fifteen degrees with respect to the beam axis. This embodiment additionally includes a fourth mirror spaced apart from the first and second mirrors, aligned to reflect the second half of the laser beam from the second mirror away from and behind the first and second mirrors at an angle of generally forty-five degrees with respect to the beam axis. This embodiment moreover includes a fifth mirror oriented generally perpendicular to the beam axis and positioned behind the first and second mirrors to reflect the first half of the laser beam from the third mirror towards the fourth mirror at an angle of generally two hundred twenty-five degrees with respect to the beam axis and to reflect the second half of the laser beam from the fourth mirror towards the third mirror at an angle of generally one hundred thirty-five degrees with respect to the beam axis.

Several benefits and advantages are derived from the invention. In the first preferred method, laser shock peening with laser pulses having a rectangular cross section, instead of a circular cross section, requires less overlapping of adjacent pulses to completely cover the target surface and, when a rectangular lasing medium is used, preserves polarization of the laser beam better in the cavity dumping oscillator at higher pulse repetition rates. In the second preferred method, passing the pulses two or more times through the same single-head optical amplifier eliminates the need for separate amplifiers reducing cost, space, downtime, and maintenance. In the third preferred method, driving an optically-pumped laser with a time pulse of electric current having a generally rectangular shape, instead of a generally critically-damped discharge shape, provides for a more efficient use of energy for optical pumping and reduces the thermal load problem allowing a higher laser pulse repetition rate. The first and second embodiments of the reflective laser beam homogenizer function to reverse two sides of a laser beam having a rectangular cross section, such side reversal helping to homogenize the laser beam.

DETAILED DESCRIPTION OF THE INVENTION

Figure 1:
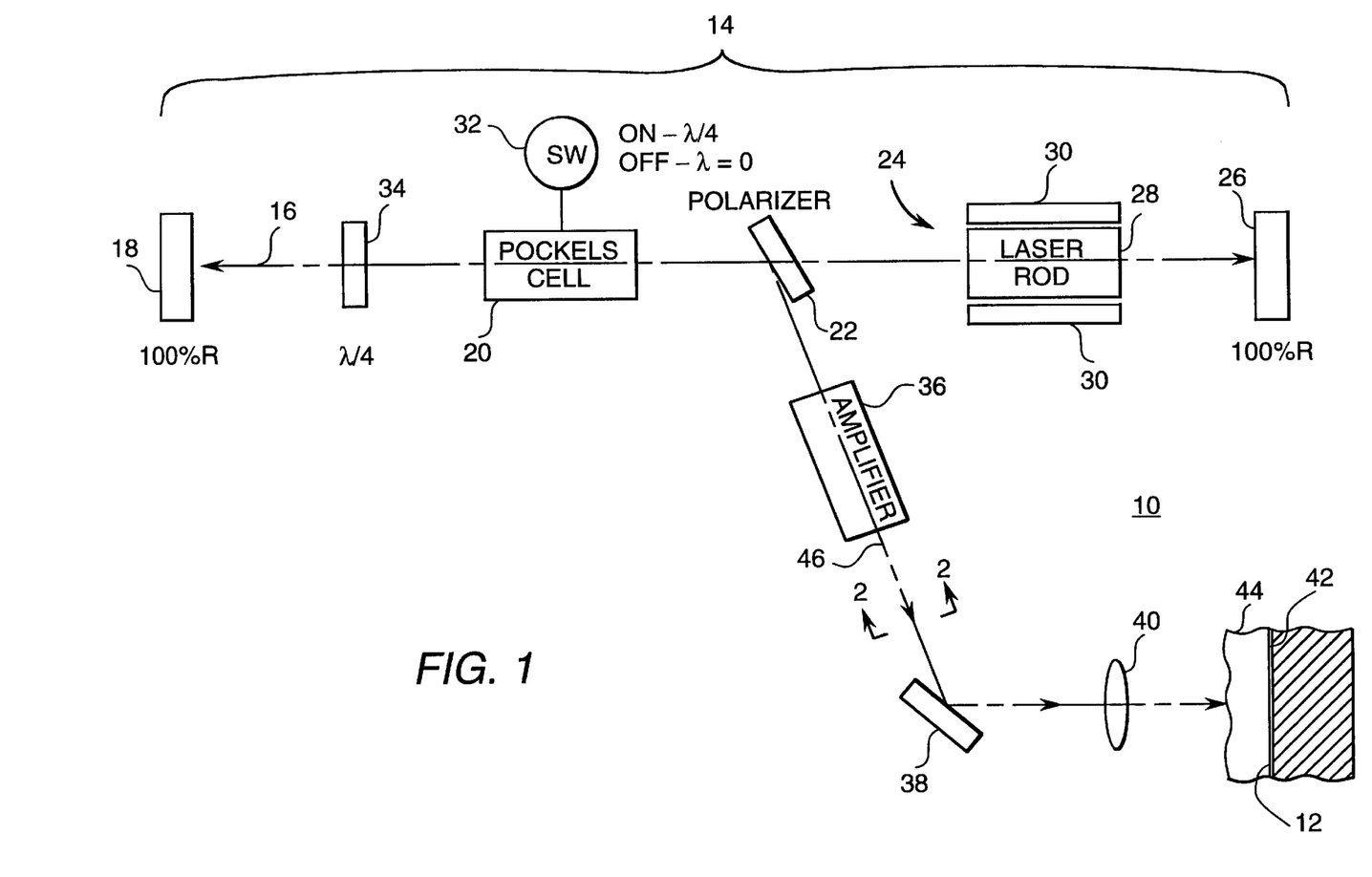
FIG. 1 is a schematic view of preferred apparatus for carrying out the method of the present invention for laser shock peening a target surface.

Referring now to the drawings, FIG. 1 schematically shows a preferred apparatus 10 for carrying out the method of the present invention for laser shock peening a target (i.e., workpiece) surface 12. The apparatus 10 includes a cavity dumping oscillator 14 which generates a laser beam 16 and directs the laser beam 16 against the target surface 12. Preferably, the target is a metallic target such as a gas turbine blade, the cavity dumping oscillator 14 is a Q-switched cavity dumping oscillator, and the laser beam is a pulsed laser beam having a pulse and a pulse repetition rate.

The cavity dumping oscillator 14 has, in optical alignment, a first end mirror 18, a Pockels cell 20, a polarizer 22, an optically-pumped laser 24, and a second end mirror 26. It is noted that the order of the optical elements may be changed from that shown in FIG. 1 without affecting the operation of the oscillator 14, as is known to those skilled in the art. For example, and without limitation, the laser 24 may be positioned to the left of the polarizer 22, and/or the polarizer 22 may reflect (rather than transmit) to a repositioned second end mirror 26. The first and second end mirrors 18 and 26 provide generally 100% reflectivity (R). The optically-pumped laser 24 includes a lasing medium 28 and surrounding flash lamps 30 for optically pumping the lasing medium 28.

A conventional driver 32 is operatively connected to the Pockels cell 20 for polarization rotation by selective wave retardation of the pulse of the laser beam 16 to control operation of the oscillator 14. The Pockels driver 32 operates by providing a bias voltage across the Pockels cell 20 for selectively controlling the wave retardation thereof. Preferably, a conventional quarter-wave plate 34 (l/4) is disposed in optical alignment between the first end mirror 18 and the Pockels cell 20. The Pockels driver 32 provides a bias voltage to the Pockels cell 20 for quarter-wave retardation in the Pockels cell 20 to permit the pulse of the laser beam 16 to pass through the polarizer 22 when the oscillator 14 is in the regeneration mode. When the energy reaches its peak value, the Pockels driver 32 is turned off, and the Pockels cell 20 provides zero wave retardation to permit the pulse of the laser beam 16 to be deflected by the polarizer 22 when the oscillator 14 is put in the dump mode. The Pockels driver 32 operates as a switch (SW) between the regeneration and dump modes of the oscillator 14. The structure and the operation of the oscillator 14, as described to this point, are well understood by the artisan.

The apparatus 10 also includes, in optical alignment, an optical amplifier 36, for amplifying the pulse of the laser beam 16 deflected by the polarizer 22, and a turning mirror 38 and focusing lens 40 unit for directing the amplified pulse of the laser beam 16 against an area on the target surface 12. It is noted that the unit contains at least one turning mirror 38 and at least one focusing lens 40 and that the position of the mirror 38 and lens 40 may be interchanged. Preferably, the target surface 12 is covered by an ablative coating 42 (e.g., black paint) which is covered by a thin film of water 44. Either the target surface 12 is moved to receive the next amplified pulse of the laser beam 16, or the turning mirror 38 and focusing lens 40 unit is rotatable to direct the next amplified pulse of the laser beam 16 against a different area on the target surface 12.

Figure 2:
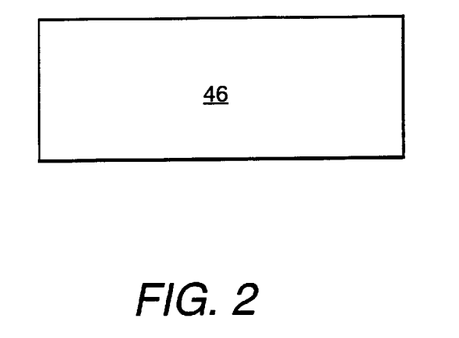
FIG. 2 is a cross sectional view of a laser beam pulse of FIG. 1, taken along arrows 2—2 in FIG. 1.

A first preferred method for laser shock peening the target surface 12 includes steps a) through d). Step a) includes the step of generating a first pulse 46 of the laser beam 16 from the cavity dumping oscillator 14 having, in optical alignment, the first end mirror 18, the Pockels cell 20, the polarizer 22, an optically-pumped slab laser type of optically-pumped laser 24, and the second end mirror 26, wherein the first pulse 46 has a cross section taken perpendicular to the laser beam, and wherein the cross section of the first pulse 46 has a generally rectangular shape (as shown in FIG. 2). Step b) includes the step of directing the first pulse 46 against a first generally rectangular area on the target surface 12. Step c) includes the step of generating a second pulse of the laser beam 16, wherein the second pulse has a cross section taken perpendicular to the laser beam, and wherein the cross section of the second pulse has a shape which is generally identical to the generally-rectangular shape of the cross section of the first pulse. Step d) includes the step of directing the second pulse against a second generally rectangular area on the target surface 12, wherein the second rectangular area is proximate the first rectangular area. Preferably, in step d) the second pulse is directed such that the second rectangular area is generally aligned with, and generally adjoins, the first rectangular area. The two rectangular areas can overlap somewhat to ensure complete surface coverage. It is noted that laser shock peening using laser pulses having a rectangular cross section, instead of conventionally using a circular cross section, requires less overlapping of adjacent pulses to completely cover the target surface 12 and, when a rectangular lasing medium 28 is used, preserves polarization of the laser beam 16 better in the cavity dumping oscillator 14 at higher pulse repetition rates.

Figure 3:
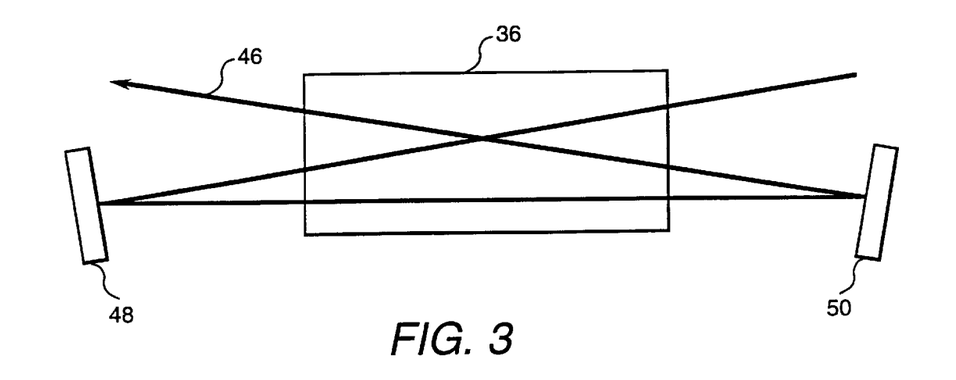
FIG. 3 is an enlarged and more detailed view of the optical amplifier of FIG. 1 which includes two reflective mirror assemblies.

A first exemplary technique for implementing the first preferred method of the invention also includes, between steps a) and b), the steps of passing the first pulse 46 a first time and a second time (and preferably a third time) through a same single-head optical amplifier type of optical amplifier 36. The first exemplary technique additionally includes, between steps c) and d), the steps of passing the second pulse a first time and a second time (and preferably a third time) through the same single-head optical amplifier 36. In a preferred construction, the additional passes of a laser pulse (such as the first pulse 46) through the same optical amplifier 36 is accomplished by optically reflecting devices 48 and 50, such as mirrors (as shown in FIG. 3). It is noted that passing the laser pulses two or more times through the same single-head optical amplifier type of optical amplifier 36 eliminates the need for separate amplifiers reducing cost, space, downtime, and maintenance.

Figure 4:
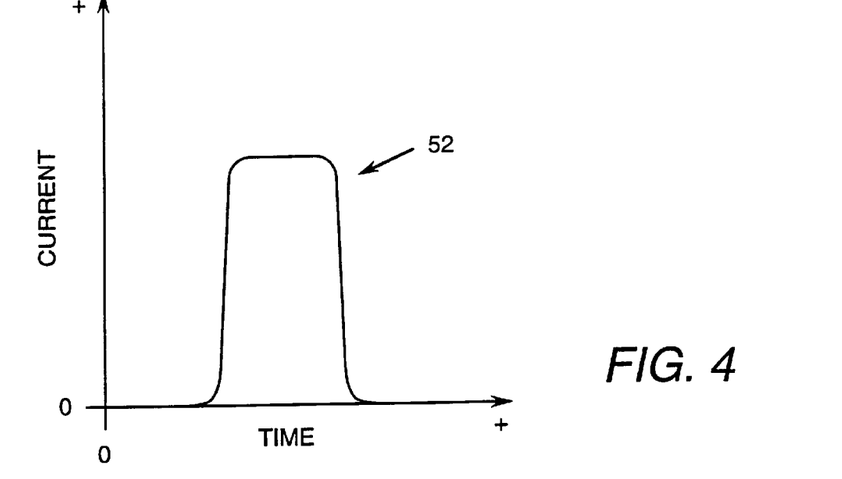
FIG. 4 is an unscaled graph of electric current versus time showing a preferred time pulse of current for driving the laser and for driving the optical amplifier of FIG. 1.

In a second exemplary technique for implementing the first preferred method of the invention, the optically-pumped slab laser type of optically-pumped laser 24 is driven by a time pulse of electric current 52 having a generally rectangular shape (as shown in FIG. 4), and also including the step of driving the single-head optical amplifier type of optical amplifier 36 with a time pulse of electric current having a generally rectangular shape (similar to the time pulse of electric current 52 for driving the optically-pumped slab laser type of optically-pumped laser 24). It is noted that driving the optically-pumped laser 24 (or optical amplifier 36) with a time pulse of electric current having a generally rectangular shape, instead of a generally critically-damped discharge shape, provides for a more efficient use of energy for optical pumping and reduces the thermal load problem allowing a higher laser pulse repetition rate.

In a third exemplary technique for implementing the first preferred method of the invention, the steps of passing the first pulse 46 a first time and a second time through the single-head optical amplifier type of optical amplifier 36 each include passing the first pulse 46 straight through (without any total internal reflections) the single-head optical amplifier type of optical amplifier 36. Likewise, the steps of passing the second pulse a first time and a second time through the single-head optical amplifier type of optical amplifier 36 each include passing the second pulse straight through the single-head optical amplifier type of optical amplifier 36. It is noted that passing a laser pulse straight through an optical amplifier eliminates the need for optically polished surfaces required for the conventional total internal reflection technique of passing a laser pulse through an optical amplifier. In addition, between the steps of passing the first pulse a first time and a second time straight through the single-head optical amplifier type of optical amplifier 36, there is included a step of generally homogenizing the first pulse 46. Likewise, between the steps of passing the second pulse a first time and a second time straight through the single-head optical amplifier type of optical amplifier 36, there is included the step of generally homogenizing the second pulse. It is noted that passing a laser pulse straight through an optical amplifier results in cross-sectional areas of the rectangular-cross-sectioned laser pulse, taken perpendicular to the laser beam, having unequal amplification, and that homogenizing the laser pulse will result in more uniform amplification which will produce more uniform laser shock peening of the target surface 12. Such unequal amplification typically results in higher gain near the sides of the laser pulse. In a preferred procedure, the homogenizing step for the first pulse includes splitting the first pulse into two half pulses, as seen in the cross section of the first pulse, and interchanging the half pulses of the first pulse. Likewise, the homogenizing step for the second pulse includes splitting the second pulse into two half pulses, as seen in the cross section of the second pulse, and interchanging the half pulses of the second pulse.

A second preferred method for laser shock peening the target surface 12 includes steps a) through f). Step a) includes generating the first pulse 46 of the laser beam 16 from the cavity dumping oscillator 14 having, in optical alignment, the first end mirror 18, the Pockels cell 20, the polarizer 22, the optically-pumped laser 24, and the second end mirror 26. Step b) includes the step, after step a), of passing the first pulse 46 a first time and a second time through the single-head optical amplifier type of optical amplifier 36. Step c) includes the step, after step b), of directing the first pulse 46 against a first area on the target surface 12. Step d) includes the step of generating the second pulse of the laser beam 16. Step e) includes the step, after step d), of passing the second pulse a first time and a second time through the single-head optical amplifier type of optical amplifier 36. Step f) includes the step, after step e), of directing the second pulse against a second area on the target surface 12, wherein the second area is proximate the first area. It is noted that the second preferred method is identical to the previously-described first exemplary technique for implementing the first preferred method of the invention, but without three previous limitations. The optically-pumped laser 24 is not required to be an optically-pumped slab laser, the first pulse 46 of the laser beam 16 is not required to have a generally rectangular cross section, and the second pulse of the laser beam 16 is not required to have a generally rectangular cross section. The second preferred method can be practiced with the previously-discussed rectangular time pulse of electric current driving the optically-pumped laser 24 and the single-head optical amplifier type of optical amplifier 36.

A third preferred method for laser shock peening the target surface 12 includes steps a) through e). Step a) includes the step of driving the optically-pumped laser 24 with a time pulse of electric current 52 having a generally rectangular shape. Step b) includes the step of generating the first pulse 46 of the laser beam 16 from the cavity dumping oscillator 14 having, in optical alignment, the first end mirror 18, the Pockels cell 20, the polarizer 22, the optically-pumped laser 24, and the second end mirror 26. Step c) includes the step of directing the first pulse 46 against the first area on the target surface 12. Step d) includes the step of generating the second pulse of the laser beam. Step e) includes the step of directing the second pulse against the second area on the target surface 12, wherein the second area is proximate the first area. It is noted that the second preferred method is identical to the previously-described second exemplary technique for implementing the first preferred method of the invention, but without three previous limitations. The optically-pumped laser 24 is not required to be (but preferably is) an optically-pumped slab laser, the first pulse 46 of the laser beam 16 is not required to have (but preferably has) a generally rectangular cross section, and the second pulse of the laser beam 16 is not required to have (but preferably has) a generally rectangular cross section. Likewise, the first and second areas are not required to be (but preferably are) generally rectangular areas. Preferably in step e), when the first and second areas are generally rectangular shaped, the second pulse is directed such that the second rectangular area is generally aligned with, and generally adjoins, the first rectangular area.

Figure 5:
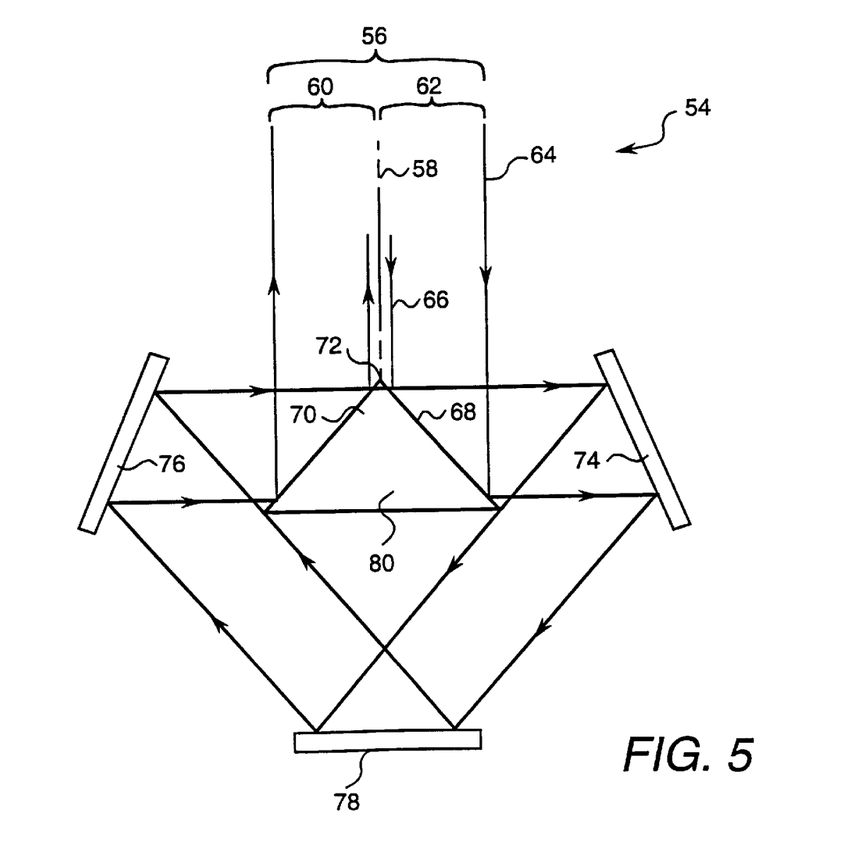
FIG. 5 is an enlarged and more detailed view of one of the two reflective mirror assemblies of FIG. 3 in which such assembly is a first exemplary construction of the reflective laser beam homogenizer of the present invention

Referring to a first exemplary construction shown in FIG. 5, a first preferred embodiment of the reflective laser beam homogenizer 54 of the present invention is for reflecting and generally homogenizing a laser beam 56, wherein the laser beam 56 has a beam axis 58, wherein the laser beam 56 has a cross section taken perpendicular to the beam axis 58, and wherein the cross section has a generally-rectangular shape (such as that of the first pulse 46, shown in FIG. 2, of the laser beam 16). Laser beam 56 may be a pulsed or continuous laser beam and may be used for laser shock peening or for any other application of a laser beam. The beam axis 58 evenly divides the laser beam 56 into a first half 60 of the laser beam 56 and an adjoining second half 62 of the laser beam 56. The two halves 60 and 62 have the shape of generally identical, side-by-side rectangles. Multiple-arrowhead line 64 depicts the path of a near-outer-edge portion of the first half 60 of the laser beam 56 through the reflective laser beam homogenizer 54. Multiple-arrowhead line 66 depicts the path of a near-inner-edge portion of the first half 60 of the laser beam 56 through the reflective laser beam homogenizer 54. It is noted that if the multiple arrowheads of multiple-arrowhead line 64 were reversed, it would depict the path of a near-inner-edge portion of the second half 62 of the laser beam 56 through the reflective laser beam homogenizer 54. Likewise, if the multiple arrowheads of multiple-arrowhead line 66 were reversed, it would depict the path of a near-outer-edge portion of the second half 62 of the laser beam 56 through the reflective laser beam homogenizer 54.

The first preferred embodiment of the reflective beam homogenizer 54 includes first and second mirrors 68 and 70. The first and second mirrors 68 and 70 generally abut each other along a generally straight edge 72, wherein the straight edge 72 is disposed to generally perpendicularly intersect the beam axis 58. The first mirror 68 is aligned to reflect the first half 60 of the laser beam 56 away from the first and second mirrors 68 and 70, and the second mirror 70 is aligned to reflect the second half 62 of the laser beam 56 away from the first and second mirrors 68 and 70.

The first preferred embodiment of the reflective beam homogenizer 54 also includes a set of additional mirrors (such as third mirror 74, fourth mirror 76, and fifth mirror 78), wherein the set consists of an odd number of additional mirrors, and wherein the additional mirrors are disposed such that the first half 60 of the laser beam 56 is reflected towards the second mirror 70 so as to be reflected by the second mirror 70 back alongside the beam axis 58 in place of the second half 62 of the laser beam 56 and such that the second half 62 of the laser beam 56 is reflected towards the first mirror 68 so as to be reflected by the first mirror 68 back alongside the beam axis 58 in place of the first half 60 of the laser beam 56.

As also shown by the same first exemplary construction of FIG. 5, a second preferred embodiment of the reflective laser beam homogenizer 54 of the present invention is for reflecting and generally homogenizing the previously-discussed laser beam 56. The second preferred embodiment of the reflective laser beam homogenizer 54 includes the first and second mirrors 68 and 70. The first and second mirrors 68 and 70 generally abut each other along the generally straight edge 72, and the straight edge 72 is disposed to generally perpendicularly intersect the beam axis 58. The first mirror 68 is aligned to reflect the first half 60 of the laser beam 56 away from the first and second mirrors 68 and 70 at an angle of generally ninety degrees with respect to the beam axis 58. The second mirror 70 is aligned to reflect the second half 62 of the laser beam 56 away from the first and second mirrors 68 and 70 at an angle of generally two hundred seventy degrees with respect to the beam axis 58.

The second preferred embodiment of the reflective laser beam homogenizer 54 also includes the third, fourth, and fifth mirrors 74, 76, and 78. The third mirror 74 is spaced apart from the first and second mirrors 68 and 70 and is aligned to reflect the first half 60 of the laser beam 56 from the first mirror 68 away from and behind the first and second mirrors 68 and 70 at an angle of generally three hundred fifteen degrees with respect to the beam axis 58. The fourth mirror 76 is spaced apart from the first and second mirrors 68 and 70 and is aligned to reflect the second half 62 of the laser beam 56 from the second mirror 70 away from and behind the first and second mirrors 68 and 70 at an angle of generally forty-five degrees with respect to the beam axis 58.

The fifth mirror 78 is oriented generally perpendicular to the beam axis 58 and is disposed behind the first and second mirrors 68 and 70 to reflect the first half 60 of the laser beam 56 from the third mirror 74 towards the fourth mirror 76 at an angle of generally two hundred twenty-five degrees with respect to the beam axis 58 and to reflect the second half 62 of the laser beam 56 from the fourth mirror 76 towards the third mirror 74 at an angle of generally one hundred thirty-five degrees with respect to the beam axis 58

Preferably, the first, second, third, fourth, and fifth mirrors 68, 70, 74, 76, and 78 have a generally rectangular shape. In an exemplary embodiment, the first and second mirrors 68 and 70 are generally identical, and the third and fourth mirrors 74 and 76 are generally identical. In a preferred construction, the first and second mirrors 68 and 70 define two sides of a front surface reflective prism 80.

Applications for using of the reflective laser beam homogenizer 54 include, but are not limited to, the previously-described laser shock peening. In a preferred construction, the optically reflective device 48 shown in FIG. 3 is the reflective laser beam homogenizer 54 shown in FIG. 5. Other applications are left to the artisan.

A more theoretical discussion of the above-described laser shock peening methods and reflective laser beam homogenizers follows.

In an exemplary Laser Shock Peening (LSP) process, typically two simultaneous pulses of electromagnetic radiation are required. These pulses have to be of relatively high energy and short duration and must be focused to a relatively small spot. It is preferred that the laser deliver two simultaneous pulses of 60 Joules energy each, of 10–20 nanoseconds duration, having a short rise time of less than 5 nanoseconds. It is also preferred that the laser be fired at a reasonable repetition rate, such as once every second. An energy of 60 Joule per beam with a duration of only 10–20 nanoseconds practically limits the field of candidate lasers to Q-switched Nd:Glass lasers. Furthermore, because of the high energy required and the limited fluence optical elements can handle, the use of a (master) oscillator—(power) amplifier combination (MOPA) is preferred. In a MOPA the pulse format is essentially made in the oscillator at a low power level and a correspondingly small beam cross section. Hence, smaller, less expensive, and, where applicable, faster optical elements can be used. The pulses from the oscillator are then fed into the amplifiers, which have to be designed such each of them outputs a pulse of 60 Joules with otherwise essentially the same characteristics as the oscillator pulses. Hence, the amplifiers must store enough energy to deliver 60 Joules and must have enough gain to amplify the oscillator pulses to the required energy. These two requirements are contradictory in the sense that a medium that can store a large amount of energy necessarily has a low specific gain and, vice versa, a medium with a high specific gain cannot store much energy. There are, however, ways around that dilemma as described below.

A preferred way to generate laser pulses of 10–20 nanoseconds duration with a rise time less than 5 nanoseconds, is a Q-switched, cavity-dumped oscillator. In order to ease the burden on the amplifiers, the oscillator should produce as much energy as possible, i.e., several Joules. That rules out the usage of Nd:YLF crystals for the gain medium, because these crystals cannot store enough energy. Hence, the oscillator medium has to be Nd:Glass, essentially the same as in the amplifiers. However, because the Q-switching and cavity-dumping requires a polarization-sensitive Pockels cell, the gain medium has to preserve the polarization. In the usual rod geometry, Nd:Glass, because of its low thermal conductivity, develops significant thermal stress birefringence already at very low average thermal load, and, hence, does not preserve the polarization. There are several ways to solve that problem: The repetition rate can be limited to such low values that the depolarization due to stress birefringence is negligible; or the stress birefringence can be compensated; or the depolarization can be avoided by choosing a rectangular geometry instead of a cylindrical rod. The brute-force solution, i.e., low repetition rate, is not acceptable here because laser shock peening production considerations dictate a repetition rate somewhere in the neighborhood of one pulse per second. Since stress birefringence compensation with a 90° quartz rotator, if two rods are used, or something equivalent in the case of a single-rod oscillator, is never perfect in practice and still puts severe limits on the achievable repetition rate, it cannot be accepted here as a solution to the depolarization problem. Applicant discovered that a preferred solution is to choose a rectangular cross section of the gain medium, which naturally also leads to a beam cross section of the same geometry, and to a linear polarization along one of the axes of the rectangle. In that case, the principal axes of the stress ellipsoids are aligned with the rectangular geometry and, hence, with the polarization, and depolarization is completely avoided. However, in a slab with a finite width, perfect alignment of the stress ellipsoids occurs only in a region that does not include the areas close to the edges of the slab. According to the principle of St. Venant, the influence of the edges extends to a distance of about one thickness away from them. Hence, the oscillator slab has to be about two times the thickness wider than the oscillator beam, and the two regions near the edges are pumped but not extracted by the oscillator. They could, however, potentially be used as a preamplifier. In crystalline slab lasers the beam often zigzags through the medium in the thickness direction of the slab and bounces off the side faces by total internal reflection (TIR). This technique removes most of the focal power in the TIR direction, which otherwise could be quite strong because of the essentially parabolic temperature distribution and the temperature dependence of the index of refraction. But the zigzag technique requires optically polished TIR faces and an extremely clean liquid for the cooling of the slab. In the case of phosphate glass, which is preferable because it has a higher specific gain than silicate glass, the phosphate glass TIR faces are slightly soluble in the water typically used for cooling the TIR faces. However, unlike in a crystalline medium such as Nd:YAG, in a glass laser the thermal load has to be kept quite low because of the much lower stress fracture limit. Hence, thermal lensing is weaker under typical operating conditions. In addition to that, there exists a glass called LHG-5, produced by HOYA Corp., that has a $dn/dT \approx 0$ and, hence, produces virtually no focal power. In this glass the beam can go straight through, and all the problems that come with the zigzag technique can be avoided. Another consideration with straight-through lasers is that the gain near the pump faces is higher than in the center, and the intensity distribution of the beam tends to copy the gain distribution. This effect can be minimized, at some sacrifice of efficiency, by choosing a glass with a low Nd doping. In addition, the Q-switched, cavity-dumped oscillator can further flatten the spatial intensity distribution, if the time of the cavity dumping is properly chosen: After Q-switching, the circulating power in a high-gain area will develop faster than where the gain is lower. But, after the circulating power in the high-gain area reaches its maximum, it starts to decay, whereas the power in low-gain regions still increases, and there will be a moment where the two are equal. That moment is the right time to dump the cavity and to extract a beam with a fairly flat intensity distribution. It has to be kept in mind that the laser shock peening process requires a beam with a smooth, flat-top profile. Such a beam typically has many transverse modes that may extract quite different parts of the gain medium and, hence, these modes can be considered as being independent from each other.

As mentioned above, the fact that an amplifier medium that can store a large amount of energy necessarily has a low specific gain, requires some ingenuity in the design of the laser shock peening amplifiers. In prior art a chain of amplifier stages, like in a fusion laser, was used. That typically leads to an expensive and bulky device with potentially a high failure rate because of the large number of components. Instead of using a multi-head, single-pass amplifier, Applicant discovered that it is more efficient to use a single-head, multi-pass amplifier. This idea is based on the fact that in the prior-art approach the final amplifier stage, in order to have an effective gain of about 2, has to store several times the energy eventually extracted from it. Hence, all the previous stages of amplification can be obtained by passing the beam several times through the final stage, practically without nibbling away any of the gain for the final, energy-extracting pass through that stage. FIG. 3 shows how a beam can be routed several (in this case three) times through a single amplifier stage. Keeping in mind that the beam from the oscillator has a rectangular cross section, it is most advantageous to give the amplifier a rectangular cross section as well such that the three passes optimally fill the slab and extract the stored energy. Since the amplifiers don't use any polarization sensitive elements, depolarization can be tolerated, and the cross section of the amplifier slab doesn't have to be bigger than the "footprint" of the three passes through it. For the same reasons as discussed in the case of the oscillator, there is no need to zigzag through the amplifier, if a glass with a low enough dn/dT is used. However, the inhomogeneous gain distribution may have to be compensated for. Applicant discovered that a substantial homogenization can be obtained if the two horizontal halves of the beam are each side-reversed after the first pass through the amplifier (which has the lowest saturation and, hence, the highest effective gain). By this operation the high intensity on the outside of the rectangular beam is flipped to the center, and the low intensity of the center is moved to the periphery. The following two passes will again lift the "shoulders" and flatten the distribution. FIG. 5 shows a device (the reflective laser beam homogenizer 54) that performs the reversal of each side of the beam, and also swaps the two sides, which, however, is not considered essential here but may help if, for whatever reason, there should be a left-right asymmetry in the intensity distribution. There are other configurations that do essentially the same. Typically they split the beam (as in FIG. 5), reverse each side in a retro-reflecting device such as a 180° prism, and recombine the two sides. Preferably, the module (the reflective laser beam homogenizer 54) of FIG. 5 replaces the optically reflective device 48 in FIG. 3.

To produce the two beams of 60 Joules energy each, as required by the laser shock peening process, one has the choice of either using two independent MOPAs, or a single oscillator whose output beam is split and fed into two amplifiers. The second choice is preferable because of its lower part count, but it requires an oscillator that delivers twice as much energy and, hence, a glass slab of substantial size. In order to get an idea of the sizes involved, one begins at the output of the amplifiers. In order to avoid damage to the coatings, one limits the fluence to less than 3.5 J/cm$^2$. This value is somewhat arbitrary, but it is more conservative than the value used in prior art. Hence, an energy of 60 Joules requires a beam cross section of 18 cm$^2$. Since the beam is rectangular, one has to choose an aspect ratio. For the sake of simplicity, an aspect ratio of 2:1 is chosen. Such a beam can easily be converted into a square cross section on target, if this is desired. Hence, at the output of the amplifier the beam size is 3 cm×6 cm. In order to accommodate for triple passing, the amplifier slab has to be somewhat wider, and a preferred choice for its cross section is 3 cm×10 cm. Repetition rate considerations (thermal load) suggest a slab as long as possible, but a long slab needs long flash lamps and correspondingly high voltages. State-of-the-art semiconductor switching elements (IGBTs) limit the voltage to about 2000 V. That fixes the slab length at about 50 cm pumped, or 55 cm total. The peak current in these IGBTs should not exceed 2000 Å, and that means one needs six lamps (3 on each side) to store enough energy in the amplifier slab in a pump pulse of 300 $\mu$s. Each lamp has a bore diameter of 1.3 cm and is filled with about 600 Torr xenon gas. Krypton is not desired, because it causes more energy to be deposited near the surface.

A preferred choice is the same aspect ratio for the oscillator beam, but a reduction in the (linear) dimensions by a factor of 2. Hence, the size of the oscillator beam is 1.5 cm×3 cm which, as explained above, requires an oscillator slab of a 1.5 cm×6 cm cross section. For its length a preferred choice is half the length of the amplifier slab, i.e., 25 cm pumped, or 30 cm total. It can be pumped by two lamps (one on each side) which have the same bore diameter as the amplifier lamps, but only half their length. Hence, when connected in series, the two oscillator lamps look electrically exactly like one amplifier lamp and can be driven by an identical power supply.

The most important considerations for the choice of lamp drivers are pulse-to-pulse stability, low electromagnetic interference (EMI), and lamp life. Clearly the lamps have to be simmered for long life, good repeatability, and low EMI. Instead of the conventional pulse forming networks (PFNs), Applicant discovered it is advantageous to choose a square-pulse lamp driver because it requires only half the voltage (and peak current), doesn't need impedance matching, and has a better pulse-to-pulse stability. The usual trigger transformer to break down the arc in the lamps is eliminated because it is electrically noisy and requires extremely high voltages. Instead, a slower method is used, which consists of slowly charging a capacitor to a moderately high voltage, until the arc in the lamp breaks down and the capacitor is discharged into the lamp through a current limiting resistor. This discharge causes a channel of enough ionization in the lamp so that the simmer supplies can take over and keep the arc alive. This method has two major advantages: Because the arc has much more time to break down, only a much lower voltage is required (typically 10 kV instead of 40 kV), and at the time of the breakdown the current is limited and the time constant is longer. The result is almost complete elimination of EMI and reduced sputtering in the lamp and, hence, improved lamp life. The design of a circuit to accomplish this method is within the level of skill of the artisan.

The foregoing description of several preferred methods and embodiments of the invention has been presented for purposes of illustration. It is not intended to be exhaustive or to limit the invention to the precise form or method disclosed, and obviously many modifications and variations are possible in light of the above teaching. It is intended that the scope of the invention be defined by the claims appended hereto.

What is claimed is:

1. A method for laser shock peening a target surface, the method comprising the steps of:
   a) generating a first pulse of a laser beam from a cavity dumping oscillator having, in optical alignment, a first end mirror, a Pockels cell, a polarizer, an optically-pumped slab laser, and a second end mirror, wherein said first pulse has a cross section taken perpendicular to said laser beam, and wherein said cross section of said first pulse has a generally rectangular shape;
   b) directing said first pulse against a first generally rectangular area on said target surface;
   c) generating a second pulse of said laser beam, wherein said second pulse has a cross section taken perpendicular to said laser beam, and wherein said cross section of said second pulse has a shape which is generally identical to said generally-rectangular shape of said cross section of said first pulse; and
   d) directing said second pulse against a second generally rectangular area on said target surface, wherein said second rectangular area is proximate said first rectangular area.

2. The method of claim 1, wherein, in step d), said second pulse is directed such that said second rectangular area is generally aligned with, and generally adjoins, said first rectangular area.

3. The method of claim 2, also including, between steps a) and b), the steps of passing said first pulse a first time and a second time through a same single-head optical amplifier, and, between steps c) and d), the steps of passing said second pulse a first time and a second time through said single-head optical amplifier.

4. The method of claim 3, also including, between steps a) and b), the step of passing said first pulse a third time through said single-head optical amplifier, and, between steps c) and d), the step of passing said second pulse a third time through said single-head optical amplifier.

5. The method of claim 3, wherein said optically-pumped slab laser is driven by a time pulse of electric current having a generally rectangular shape, and also including the step of driving said single-head optical amplifier with a time pulse of electric current having a generally rectangular shape.

6. The method of claim 5, wherein the steps of passing said first pulse a first time and a second time through said single-head optical amplifier each pass said first pulse straight through said single-head optical amplifier, wherein the steps of passing said second pulse a first time and a second time through said single-head optical amplifier each pass said second pulse straight through said single-head optical amplifier, and also including, between the steps of passing said first pulse a first time and a second time straight through said single-head optical amplifier, the step of generally homogenizing said first pulse, and, between the steps of passing said second pulse a first time and a second time straight through said single-head optical amplifier, the step of generally homogenizing said second pulse.

7. The method of claim 6, wherein said homogenizing step for said first pulse includes splitting said first pulse into two half pulses, as seen in said cross section of said first pulse, and interchanging said half pulses of said first pulse, and wherein said homogenizing step for said second pulse includes splitting said second pulse into two half pulses, as seen in said cross section of said second pulse, and interchanging said half pulses of said second pulse.

8. A method for laser shock peening a target surface, the method comprising the steps of:
   a) generating a first pulse of a laser beam from a cavity dumping oscillator having, in optical alignment, a first end mirror, a Pockels cell, a polarizer, an optically-pumped laser, and a second end mirror;
   b) after step a), passing said first pulse a first time and a second time through a same single-head optical amplifier;
   c) after step b), directing said first pulse against a first area on said target surface;
   d) generating a second pulse of said laser beam;
   e) after step d), passing said second pulse a first time and a second time through said single-head optical amplifier; and
   f) after step e), directing said second pulse against a second area on said target surface, wherein said second area is proximate said first area.

9. The method of claim 8, wherein step b) also includes passing said first pulse a third time through said single-head optical amplifier, and wherein step e) also includes passing said second pulse a third time through said single-head optical amplifier.

10. The method of claim 8, wherein said optically-pumped laser is driven by a time pulse of electric current having a generally rectangular shape, and also including the step of driving said single-head optical amplifier with a time pulse of electric current having a generally rectangular shape.

* * * * *